Patented Jan. 29, 1935

1,989,107

UNITED STATES PATENT OFFICE 1,989,107

NONSTRUCTURAL ADSORPTIVE CARBON AND PROCESS OF MAKING SAME

Jacque C. Morrell, Oak Park, Ill.

No Drawing. Application July 22, 1932, Serial No. 624,051

17 Claims. (Cl. 252—3)

This invention relates to the production of adsorptive or activated carbons. More particularly, it relates to an improvement in the concepts and processes of my previously issued patents for the production of adsorptive charcoals or activated carbons. These issued patents are #1,478,985, December 25, 1923, Artificial or synthetic charcoal and process of producing the same; #1,478,986, December 25, 1923, Manufacture of artificial charcoal; #1,478,987, December 25, 1923, Production of adsorbent charcoal; #1,530,392, March 17, 1925, Process of making compound adsorbent catalysts; #1,530,393, March 17, 1925, Process of Making adsorbent carbon. More particularly, the present application is a continuation in part of my co-pending application No. 608,851, filed May 2, 1932.

It is the main object of this invention to produce non-structural adsorptive or activated carbons. In activated carbons of this type it is not important that the supporting walls of the individual particles be dense or firm or that the particle or grain itself possess the structural strength required of the granular type of carbons. An example of the latter is bone black, such as is employed in filter columns in the refining of sugar, or the activated charcoals such as cocoanut char used for gas adsorption, in gas masks, etc. The structural strength of these and other types of chars is of highest importance since the life of the material depends upon its maintaining its original size and granular form. The adsorptive qualities of such chars depend to a large extent upon the number and character of the pores therein. It is to be understood in connection with the present invention that the materials undergoing treatment may be in a relatively loosely coherent condition in intermediate stages of the process, and this is desirable as it facilitates operation and treatment. However, the final product is employed and is generally useful only in a finely divided form (e. g. 100 mesh or above) and the external surface effect as well as the quality of the product enters into its efficiency as a refining, purifying or decolorizing agent. The product of the present process is employed in a finely divided condition mainly by what is known as the contact method wherein the material in finely divided or powdered form is contacted with the liquid to be treated and subsequently removed by filtration rather than by being placed in situ, such as in a filter column and passing or filtering the liquid through it. The term "non-structural" as used in the claims further means a material which is employed in a relatively finely divided or powdered condition and which does not depend necessarily for its usefulness or utility on its ability to withstand or resist shattering, abrasion and crushing and to be retained in a granular or particle form of relatively large size.

The product of the process may be employed in various industrial processes as a decolorizing and purifying agent for the removal of color and impurities from liquids and solutions, and, in general, it may be applied wherever adsorptive decolorizing, purifying and refining sugar solutions, character is required. Among its specific uses are the refining and decolorization of oils and their derivatives; the refining and decolorizing of animal and vegetable oils; as a catalyst; for decolorizing purifying and refining sugar solutions, syrups such as those from cane, corn, maple and sorghum, glycerine, and aqueous and non-aqueous solutions of organic and inorganic compounds; purification of water and as a deodorant. Other uses are: purification of gelatins, phenols, drugs, pharmaceuticals, and the bleaching and purification of various crude and partly refined off-grade and off-flavored food and vegetable oils, including cottonseed, linseed, rapeseed, cocoanut, soya beans, and animal oils and fats, such as lard, fish oils, medicinal oils, etc. Some special fields of application are: industrial water, garage wastes, paint oils, varnishes and resins, medicinals generally, recovery of waste photographic solutions, recovery of precious metals, and the like.

In one aspect the present invention comprises mixing finely divided carbon or charcoal with a binder which chars on heating, subjecting the mixture to a temperature adequate to carbonize the said binder and thereafter to an activation treatment, such as treatment with steam at elevated temperatures or with other mild oxidizing agents. In some cases the product is subsequently treated with a solvent such as dilute acid to remove ash or inert substances therefrom. The final product of the present invention is of non-structural form and is generally employed as a powder or in finely divided form.

In one specific aspect the process consists in mixing finely divided carbon or charcoal with an emulsion of a binder which chars on heating, separating the water and/or drying and then continuing the process as described. The process of making an emulsion of the binder suitable for the purpose is described in my Patents #1,440,355 and #1,440,356, but of course I do not wish to be limited to such emulsions, as other emulsions of suitable binders which char on heating may be employed.

In one of its more specific aspects the invention comprises depositing an active carbon upon one which is less active by mixing (all in finely divided form) a relatively inactive carbon such as petroleum and other cokes, coal, etc., with a more active carbon such as carbon black, wood charcoal, and chars such as those from lignite, peat and vegetable matter in general, such as chars from straw, hulls, etc. and also with a binder which chars on heating, such as pitches from various tars; or by mixing a relatively inactive carbon such as coke with a binder such as wood tar pitch, which chars on heating and deposits under the conditions of treatment a relatively active carbon; or by mixing a relatively active carbon such as wood char, carbon black and the like with a binder such as a pitch which chars on heating and continuing the treatment as described, namely, heating and activating. Preferably the binder is in an emulsified state. It is generally recognized that carbons may be broadly divided into two classes, one consisting of the hard graphitoidal or coke-like carbon, generally of a greyish color and more or less metallic luster, inactive and sometimes referred to as "beta carbon", the other consisting of the soft, dull, velvety or non-graphitoidal variety, generally of a deep black color, active and sometimes referred to as "alpha carbon". Of course, it is recognized that there are no absolute lines of demarcation between the two types of carbon but sufficient examples will be given to illustrate what is meant thereby; for example, graphite is an extreme example of the first class and carbon black is an example of the other class. Also, cokes such as those from coal and petroleum would be an example of the first class, whereas wood charcoal and vegetable carbons generally would be examples of the second class, the two latter classes, however, approaching each other more closely than the two former examples mentioned and falling in between them.

In general, the invention contemplates the production of active carbons suitable for the purposes heretofore mentioned from carbonaceous materials such as coke, coal, wood charcoal and other chars such as those from lignite, peat and vegetable matter generally, such as chars from straw, hulls, etc., carbon black, lamp black and the like, employing tarry or pitch-like binders.

The binders used in the present case are generally those which char on heating and are preferably pitches, which in general are the residues produced from organic substances which decompose when subjected to destructive distillation in complete or partial absence of air and to such an extent that a complete carbon residue is not produced. Some of the common classes of pitches are: (a) Tar pitches which include those produced from the tars of wood, bone, coal, shale, lignite, peat, straw, hulls and bitumens, water gas and oil gas tars; (b) Oil pitches, including the residues from distillation and cracking of animal, vegetable and in some cases petroleum oils of asphalt, paraffin, naphthene or other base; (c) Pitches from destructive distillation of animal and vegetable matter including those of stearin, palm oil, bone fat, packing house fat, garbage, sewage, grease, etc.; (d) Pitches resulting from the destructive distillation of native bitumens, asphalts, asphaltites, coal, peat, lignite, etc. Specifically, coal tar and wood tar pitches are preferred as binders. These pitches and corresponding tars may be employed in the present invention, the pitches however being preferred as the products produced therefrom are generally superior and more readily activated; hence the two classes are not strictly equivalent. All of the binders referred to above, including the various classes of tars and pitches, may be classified as bituminous binders and are so referred to in the claims. Various oils (in many cases from the tars mentioned above) may be used in conjunction with the above pitches as binders, e. g., coal tar oils, wood tar oils, etc.

While I prefer to employ the process of mixing the carbon with the binder disclosed in my patent, serial #1,440,356, wherein some form of carbon or charcoal is mixed with an emulsion of a binder which chars on heating, other methods of incorporating the charcoal with the binder may be employed as disclosed in the aforementioned issued patents. Some of the methods of accomplishing the mixing are:

(a) The carbon may be mixed directly with the emulsified binder either as such or the carbon may be suspended in an aqueous medium and mixed with the emulsified binder. In most cases the water contained in the emulsion will be separated by filtration, etc., but in some cases the mixture containing the emulsion may be heated directly to carbonize the binder.

(b) The carbon may be mixed with a solution of a binding material which chars on heating, separating the solvent by distillation. The solvent may be a relatively low boiling liquid such as benzol, naphtha, petroleum hydrocarbons or coal tar fractions, or higher boiling solvents may be used and separated during the carbonizing treatment.

(c) The carbon may be mixed with a liquid binder which chars on heating, such as a tar directly produced or similar product thereto such as an oil added to a pitch.

(d) The carbon may be mixed with non-fluid (solid) pitch or other non-fluid binder which chars on heating and may also thereafter be mixed with a fluid such as oil, tar, or other organic liquid which will dissolve, disperse or flux with the binder.

(e) The carbon may be mixed directly with a pitchy binding material by heating the same, thus rendering it quite fluid, and intimately mixing the finely divided carbon therewith, preferably by mechanical means.

In some cases it may be desirable to add to the mixture of carbon and binder a substance which is to be later removed by solution with a solvent, for example, calcium or magnesium carbonate, calcium or magnesium oxide, or in general finely divided metals, oxides of metals, salts, etc. These substances may be removed from the carbonized and activated product by treatment with a solvent, for example, water when the material is water soluble, and a dilute acid, for example, hydrochloric, when the material is acid-soluble. Also, in the case of carbon bases containing ash naturally, for example, wood charcoal, the final product may be subjected to treatment with hot water and/or an acid, finally water washed when acid treated and dried to remove the ash. It may also be desirable to add substances to the material which volatilize and/or react with the carbonaceous material during the treatment, such as zinc chloride, phosphoric acid and similar materials.

It is to be understood that the above methods are not to be considered as equivalent in the sense of quality of product or results produced, the particular method chosen depending on the raw materials employed and results desired.

The term "carbon" as herein employed is intended to cover pure carbon as well as a mixture of natural or artificial origin containing a high percentage of carbon. This includes the various charcoals and carbons of animal, vegetable or mineral origin.

The following description shows one of the methods of operating the process. Finely divided carbon, for example, hard-wood charcoal, petroleum coke or a mixture thereof, is mixed with water containing a protective colloid to make a thick paste of the same. The protective colloid may consist of any of the classes of materials described in my issued Patent #1,440,356, for example, ammonium tannate or casein. The latter is prepared by dissolving the casein in a dilute solution of an alkali such as sodium hydroxide, sodium carbonate or ammonia.

An emulsion of soft pitch is prepared by first suspending finely divided hard pitch, for example, coal tar or wood tar pitch (preferably employing wood tar pitch where coke alone is used as the carbon base) sufficiently hard to grind, for example, of approximately 220° F.–300° F. melting point in water containing a protective colloid, for example, casein dissolved in a dilute alkali; and then preparing an emulsion of a coal tar (or other tar) distillate, for example, anthracene oil, creosote oil, or the like, by agitating the oil with an equal volume of an emulsifying agent, which consists of water containing dissolved therein one of the classes of protective colloids previously referred to, for example, casein dissolved in an alkali solution. The suspension of pitch and emulsion of oil are mixed and the resulting emulsified binder is mixed with the finely divided carbon. The water is separated preferably by filtration.

The mixture is then subjected to heat treatment to carbonize it. The carbonized product is then subjected to activation by steam treatment or by other oxidizing gas, such as air, chlorine, flue gas and the like, or other activating treatments. In the present example when hardwood charcoal or similar carbon base is employed the carbonized and steam treated char is preferably subjected to treatment with hot water and/or dilute acids, such as hydrochloric acid, to remove ash and other impurities, subsequently water washed and then dried.

In the carbonizing treatment temperatures of from approximately 900° F. to 1800° F., more or less, may be employed. For steam activation or other gas activating treatments temperatures of from 1200° F. to 1800° F., more or less, may be employed. The acid concentrations for the treatment of the activated products (when employed) may vary from less than 1% to 10% and upwards and various acids may be employed, such as hydrochloric, sulphuric, etc. During carbonization and activation the time of treatment will depend upon temperature conditions as well as other conditions and schedules varying from fifteen minutes up to several hours and longer have been employed.

A more specific example describing the preparation of decolorizing and/or adsorbent charcoal according to my process is given below.

The raw materials used in this particular case are wood charcoal, preferably from hardwood, such as maple, oak, hickory, birch and the like (or a mixture of the same with carbon black) of approximately 50 mesh and upward, 200 mesh and above preferred. Pitch from the distillation of wood, preferably hardwood pitch or a coal tar pitch of approximately 250° F. melting point, or of sufficient hardness to be ground, is employed in making the suspension of the binder. The pitch is ground approximately 50 mesh and upward, preferably by first crushing and then grinding wet in a ball mill, using a protective colloid such as casein which is dissolved in an alkali solution, preferably sodium carbonate solution or dilute ammonia. Creosote oil from the distillation of high temperature coal tar or other coal tar distillate is emulsified in the solution made by dissolving casein in an alkali, such as sodium carbonate. The emulsion of oil is added to the suspension of pitch, or vice versa, to prepare the emulsified binder, as disclosed in my Patent #1,440,356. As an example of the preparation of the casein solution, approximately 1% by weight of sodium carbonate may be dissolved in water, the solution heated to approximately 150° F. and into the heated alkaline solution is stirred approximately 2% by weight of casein. The solution is preferably allowed to cool before using.

The solution may be diluted before making up the pitch suspension, which may be prepared by adding an equal part by weight of the diluted solution to the finely divided pitch, stirring vigorously and then preferably subjecting the paste or suspension to a grinding or attrition action, such as in a ball mill. To this is added an emulsion of coal tar (or wood tar) distillate, preferably creosote oil prepared by emulsifying the oil in an equal part of the afore-mentioned casein solution. In preparing this emulsion the oil may be added slowly to the casein solution and vigorously agitated during or between additions until the required quantity of oil has been added. The oil emulsion is then mixed with the pitch suspension, the resulting system containing a stable emulsion of soft pitch in the proportion, for example, of 50 to 60 parts of the creosote oil for each 100 parts of the hard pitch. It is desirable to add to the emulsion of soft pitch prepared as described a small amount of ammonium tannate solution to stabilize the same.

Hardwood charcoal, for example, that from maple, oak, hickory, birch or the like, ground to approximately 150–200 mesh and upward, is then mixed with the emulsion. Preferably, the charcoal is moistened with or suspended in some of the dilute casein solution. As one example, the final mixture of creosote oil, pitch and charcoal may contain approximately 50 to 60 parts of oil, 100 parts of pitch and 240 parts of charcoal by weight, and in addition there will be present very small proportions of soda ash or sodium carbonate and casein. These proportions will vary, e. g., keeping the oil and pitch constant as in the above example the carbon may vary from 160 to 300 parts, more or less.

As a general rule, only sufficient water is present with each of the individual components to permit thorough mixing so that preferably the various components are finally suspended in water to the consistency of a thin paste. Generally speaking, somewhat in excess of an equal quantity of water containing the protective agents, such as sodium carbonate and casein, is required relative to the suspended materials. After thoroughly mixing all the components the water is separated, preferably by filtering. A vacuum type filter has been found suitable for this purpose. In some cases the addition of carbon black or other filter aid facilitates filtration.

The residue on the filter is then dried by heating, for example, starting with a temperature of 250° F. and completing at approximately 190° F. During drying lumping may occur, and it may be desirable that the mixture be kept in more or less a state of agitation to obtain proper drying, or the wet residue may be fed directly in the carbonizing furnace for the next step in the process. In some cases the mixture of emulsified binder and carbon may be fed directly to the carbonizing furnace or subjected only to preliminary drying and then carbonized, the amount of water in such cases being kept to a minimum.

While I have described in detail the preparation of a mixture by one of the methods employed in the present invention in preparing the mixture of carbon and binder, it is to be understood that other methods such as those previously described may be employed, for example, the charcoal may be mixed directly with a soft pitch binder or a solution thereof, or with a finely divided hard pitch binder alone or by the addition later of a small amount of solvent for the binder, in general with a binder which chars on heating, and subsequently subjected to carbonization. The method employed depends upon materials used and results desired.

In the carbonization operation, heating schedules from twenty to sixty minutes at temperatures varying from 1200° F. to 1500° F. have been found satisfactory. Generally speaking, carbonization in thin layers is preferred. The use of a continuous rotary type of furnace has been found satisfactory. The principal object here is to heat the material uniformly and prevent formation of secondary inactive carbon. After the carbonization treatment the charge is subjected to a second heat treatment in the presence of steam at temperatures between approximately 1500° F. and 1800° F. for about twenty minutes to two hours. In some cases it has been found desirable to introduce steam into the charge while undergoing carbonization.

While I have described the preparation of a charcoal with wood char and/or coke using hardwood pitch or coal tar pitch binders, it is to be understood that these are merely for examples, as many possible combinations between the various classes of carbons and binder materials that char on heating may be made, or mixtures of the various carbons and the various binders which char on heating may be made, for example, suitable products may be prepared by using carbon, as illustrated, by wood char, lignite char, peat char, char from various straws and hulls and other vegetable matter, coke from petroleum, either from straight distillation or cracking operations, coal, coke from coal, lamp black, carbon black and the like, and the various pitches illustrated, for example, by coal tar pitch, wood tar pitch and various similar substances which char on heating. Also various mixtures of the carbon materials may be employed in combination with individual binders, or with mixtures of the binders, or substances which char on heating in various combinations.

When a vegetable char, wood char and the like is employed the product is generally washed with a dilute acid and water washed, preferably before final grinding of the more or less weakly coherent non-structural product. In general the carbons may be distinguished from the binders in that the carbons are not liquefied nor do they soften by heat treatment and usually the amount of volatile matter is less than non-volatile, whereas generally the binders do soften or liquefy by heat treatment and are usually higher in volatile matter. However, the carbons may contain considerable volatile matter on the one hand and the binders contain considerable free carbon on the other. The binders may be materials of a pitchy, asphaltic, resinous or similar characteristic which may be in a non-fluid or solid state, or which may be of such melting point characteristics as to conform to the shape of the containing vessel. Pitches, particularly those obtained from coal tars and hardwood tars, are preferred as binders.

In making the various mixtures preparatory to carbonizing the same, one of two broad general methods may be employed, both of which are comprised within the scope of the invention: (a) Carbonaceous material may be mixed with a binder (which chars on heating) and may be carbonized and activated under conditions which will cause the deposition and formation of an active carbon or char resulting from the decomposition of the binder upon the carbon base used in the original mixture, e. g., coke and wood tar pitch. (b) A relatively inert carbon base, such as the coke derived from petroleum, coal, etc., may be mixed with a relatively active carbon or charcoal, such as carbon black or suitable vegetable char preferred, hardwood char from hickory, oak, maple and the like, and a suitable binder such as a coal or wood tar pitch may be incorporated in the mixture. In the latter case the activity of the resulting product is due not only to the deposited secondary carbon from the decomposition of the binder (particularly from the wood tar and similar vegetable tar pitch binders) but also from the active char (carbon black and wood char) incorporated in the original mixture. In the first case (a) an inactive carbon, such as coke, coal and the like, may be used as the base carbon material, employing a binder such as wood tar pitch or similar pitch which under the conditions of treatment deposits an active carbon on the relatively inactive carbon. In the second case (b) an active char, such as wood or other vegetable char, is mixed with the relatively inactive char, such as coal or coke (preferably petroleum coke); preferably before the binder is incorporated. A third case is the use of an active carbon such as has been described with a binder such as a coal tar pitch preferably (or asphaltic material), which would ordinarily deposit an inactive carbon where an inactive carbon base is employed. The three cases are not equivalents.

It is usually preferred that the carbon base be ground to 200 mesh or above, although approximately 50 mesh and above may be found satisfactory.

The binder, e. g., the pitch, also serves to build up a weakly coherent structure which is desirable during processing, e. g., heating and solvent treatment where the latter is required, as well as in the final product even though it is usually comminuted to more or less fine particles, although it is not suitable as a truly structural char and is distinctly different from it.

Apparently the carbonization of the binder, particularly pitches from vegetable matter, while in contact with the carbon base causes the formation of an active carbon or one which is easily rendered active.

Some examples as to relative amounts of specific types are given below:

(a) When employing a coke from the destructive distillation or cracking of hydrocarbon oil as a carbon base and a hardwood tar pitch binder the ratio of coke to pitch employed in the mixture may be 1 to 4 parts of coke to 1 part of pitch. A similar ratio may be used when coal tar pitch is employed as a binder. The preferred ratio of coke to pitch is approximately 2:1. A somewhat larger proportion of pitch is used when it is incorporated directly as a soft pitch. In general, as the volatile matter in the pitch increases its relative proportion is increased, within certain limitations.

(b) Various mixtures of carbon bases, such as coke from petroleum, coal, etc., preferably the former, as described under (a) and wood, preferably hardwood charcoal, have been used, varying from 10% or less of wood char to 90% or more of coke, and vice versa. The ratio of carbon base to pitch may be as stated under (a), namely, 1 to 4 carbon to 1 pitch with a preferred ratio of approximately 2 to 1.

(c) A wood char or carbon black base or mixture thereof, or similar types, may be mixed with wood tar pitch or coal tar pitch employing in general a ratio of approximately 1 to 4 parts of the carbon base to 1 of the pitch, or vice versa, as limits, with 2 parts of carbon to 1 part of pitch as the preferred ratio.

The proportions of various materials are given merely as examples and they may vary more widely depending upon the results desired, e. g., a larger ratio of carbon to binder may be employed in some cases.

The binder in the above cases may be incorporated in any of the manners described but preferably are incorporated in emulsified state as described in detail above.

As specific examples of results which may be obtained the following are given:

| Carbon base | Binder | Binder ratio parts carbon to pitch | Percent decolorization of standard solution of raw sugar (product approximately 200 mesh and above) |
|---|---|---|---|
| Hardwood char | Wood tar pitch | 2.3:1 | 98 |
| Do | Coal tar pitch | 2.3:1 | 95 |
| 50% hardwood char / 50% petroleum coke | Wood tar pitch | 2:1 | 94 |
| 50% hardwood char / 50% petroleum coke | Coal tar pitch | 2:1 | 88 |
| 25% hardwood char / 75% petroleum coke | Wood tar pitch | 2:1 | 92 |
| 25% hardwood char / 75% petroleum coke | Coal tar pitch | 2:1 | 85 |
| 12½% hardwood char / 87½% petroleum coke | Wood tar pitch | 2:1 | 86 |
| 12½% hardwood char / 87½% petroleum coke | Coal tar pitch | 2:1 | 82 |
| 25% carbon black / 75% petroleum coke | Wood tar pitch | 2.3:1 | 90 |
| Petroleum coke | do | 2.3:1 | 80 |
| Do | Coal tar pitch | 2.3:1 | 50 |

For comparison a good grade of bone black on the above decolorizing scale and under comparable test conditions (using equal volumes) would show an average of 70%. Generally the boneblack is higher in density than the char of the present process, which would indicate that the present chars are even more efficient than is shown by this comparison and especially when the comparison is made on the basis of employing sufficient boneblack to decolorize to the same extent as the chars.

By "binder ratio" is meant the amount of carbon to pitch employed, for example, 2:1 means 2 parts by weight of carbon to 1 part pitch.

In the examples in the table the pitch is in an emulsified condition made in accordance with my processes referred to. The weight of pitch employed is on the basis of a hard pitch melting at approximately 250° F. Approximately 50% of creosote oil by weight of the pitch is employed. This data is given simply to characterize the kind and proportion of materials used in the above examples rather than to limit them.

Results comparable to those shown may be obtained by the other modifications described herein but the method used in these specific cases is preferred as giving superior results generally. The method selected depends on the results desired and the raw materials employed.

The above examples are given for illustrative purposes only, and it may be readily recognized that many combinations of carbon bases and binders, singly or in admixture, may be employed within the scope of the invention. It may be also recognized that the conditions of treatment, such as temperatures of carbonizing and activation, may vary, all within wide limits. Hence the specific examples are not to be considered as limitations upon the broad scope and spirit of the invention.

I claim as my invention:

1. A process of making non-structural activated carbon suitable for refining, purifying and decolorizing purposes which comprises subjecting a mixture of an active carbon base and a bituminous binder to a temperature adequate to carbonize and to char the binder, the said mixture not having been subjected to a compression treatment prior to heating the same to carbonize it, and activating the resulting product by heating in the presence of an agent having a mild oxidizing action.

2. A process of making non-structural activated carbon suitable for refining, purifying and decolorizing purposes which comprises mixing a non-mineral carbon and a bituminous binder and subjecting the mixture to a temperature adequate to carbonize and to char the binder, the said mixture not having been subjected to a compression treatment prior to heating the same to carbonize it, and activating the resulting product by heating in the presence of a gas having a mild oxidizing action.

3. A process of making non-structural activated carbon suitable for refining, purifying and decolorizing purposes which comprises mixing non-mineral carbon and a bituminous binder comprising a material of substantially non-mineral origin which chars on heating, subjecting the mixture to a temperature adequate to carbonize and to char the binder, the said mixture not having been subjected to a compression treatment prior to heating the same to carbonize it, activating the resulting product by heating in the presence of a gas having a mild oxidizing action, and treating the product with a solvent capable of removing undesirable impurities.

4. A process of making non-structural activated carbon suitable for refining, purifying and decolorizing purposes which comprises mixing a non-mineral carbon and a bituminous binder of vegetable origin which chars on heating and subjecting the mixture to a temperature adequate to carbonize and to char the binder, the said mixture not having been subjected to a compression treatment prior to heating the same to carbonize it, activating the resulting product by heating in the presence of steam and treating the product with a dilute acid to remove undesirable impurities.

5. A process of making non-structural activated carbon suitable for refining, purifying and decolorizing purposes which comprises subjecting a mixture of a non-mineral carbon and a tar-like binder which chars on heating to a temperature adequate to carbonize and to char the binder, the said mixture not having been subjected to a compression treatment prior to heating the same to carbonize it, and activating the resulting product by heating in the presence of a gas having a mild oxidizing action.

6. A process for making non-structural activated carbon suitable for refining, purifying and decolorizing purposes which comprises mixing finely divided non-mineral carbon with a pitch-like binder which chars on heating, heating the resulting mixture to a temperature adequate to carbonize and char the binder, the said mixture not having been subjected to a compression treatment prior to heating the same to carbonize it, and activating by heating in the presence of a gas having a mild oxidizing action.

7. A process for the production of non-structural activated carbon suitable for refining, purifying and decolorizing purposes which comprises mixing a non-mineral carbon with an emulsion of a bituminous binder which chars on heating, subjecting the mixture to a temperature adequate to carbonize and char the binder, the said mixture not having been subjected to a compression treatment prior to heating the same to carbonize it and activating by heating in the presence of a gas having a mild oxidizing action.

8. A process for the production of non-structural activated carbon suitable for refining, purifying and decolorizing purposes which comprises mixing wood char with a bituminous binder comprising a material of vegetable origin, heating to a temperature adequate to carbonize and to char the binder, the said mixture not having been subjected to a compression treatment prior to heating the same to carbonize it, and activating the resulting product by heating in the presence of steam.

9. A process for the production of non-structural activated carbon suitable for refining, purifying and decolorizing purposes which comprises subjecting a mixture of wood charcoal in finely divided form and a bituminous binder which chars on heating to a temperature adequate to carbonize and char the binder, the said mixture not having been subjected to a compression treatment prior to heating the same to carbonize it, subjecting the mixture to steam treatment, and subjecting the resulting product to the action of a solvent to remove impurities.

10. A process for the production of non-structural activated carbon suitable for refining, purifying and decolorizing purposes which comprises subjecting a mixture of wood charcoal in finely divided form and a binder comprising wood tar pitch to a temperature adequate to carbonize and char the binder, the said mixture not having been subjected to a compression treatment prior to heating the same to carbonize it, subjecting the mixture to steam treatment, and subjecting the resulting product to the action of an acid to remove impurities.

11. A process for the production of non-structural activated carbon suitable for refining, purifying and decolorizing purposes which comprises mixing a mineral carbon of the class consisting of coals and cokes with a bituminous binder comprising wood tar pitch, subjecting the mixture to a temperature adequate to carbonize and to char the binder, the said mixture not having been subjected to a compression treatment prior to heating the same to carbonize it, and activating the resulting product by heating in the presence of a gas having a mild oxidizing action.

12. A process for the production of non-structural activated carbon suitable for refining, purifying and decolorizing purposes which comprises mixing inactive mineral carbon of the class consisting of coals and cokes with an active carbon of non-mineral origin and with a bituminous binder which chars on heating, subjecting the mixture to a temperature adequate to carbonize and to char the binder, the said mixture not having been subjected to a compression treatment prior to heating the same to carbonize it, and activating the resulting product by heating in the presence of steam.

13. A process for the production of non-structural activated carbon suitable for refining, purifying and decolorizing purposes which comprises mixing a mineral carbon of the class consisting of coals and cokes with a bituminous binder of vegetable origin which chars on heating, subjecting the mixture to a temperature adequate to carbonize and to char the binder, the said mixture not having been subjected to a compression treatment prior to heating the same to carbonize it, and activating the resulting product by heating in the presence of a gas having a mild oxidizing action.

14. A process for the production of non-structural activated carbon suitable for refining, purifying and decolorizing purposes which comprises mixing a mineral carbon of the class consisting of coals and cokes with a binder derived from wood tar which chars on heating, subjecting the mixture to a temperature adequate to carbonize and to char the binder, the said mixture not having been subjected to a compression treatment prior to heating the same to carbonize it, and activating the resulting product by heating in the presence of steam.

15. Activated carbon comprising the non-structural activated product of a mixture of vegetable char and a mineral carbon of the class consisting of coals and cokes and a uniformly distributed carbonized bituminous binder.

16. Activated carbon comprising the non-structural activated product of a mixture of a char of animal origin and a mineral carbon of the class consisting of coals and cokes and a uniformly distributed carbonized bituminous binder.

17. Activated carbon comprising the non-structural charred and activated product of a mixture of an active carbon and a mineral carbon of the class consisting of coals and cokes and a uniformly distributed carbonized bituminous binder.

JACQUE C. MORRELL.